United States Patent [19]

Nakajima et al.

[11] Patent Number: 4,608,415
[45] Date of Patent: Aug. 26, 1986

[54] COMPOSITION OF MODIFIED CHLORINATED RESINS

[75] Inventors: Jun Nakajima, Kyoto; Shiceki Morinaga, Osaka, both of Japan

[73] Assignee: Asahipen Corporation, Japan

[21] Appl. No.: 474,959

[22] Filed: Mar. 14, 1983

Related U.S. Application Data

[63] Continuation of Ser. No. 254,038, Apr. 14, 1981, abandoned.

[30] Foreign Application Priority Data

Apr. 15, 1980 [JP] Japan .................................. 55-50142
Jul. 26, 1980 [JP] Japan ................................. 55-102817

[51] Int. Cl.⁴ ........................ C08L 63/10; C08L 91/00
[52] U.S. Cl. ................................ 525/111.5; 525/111; 525/133.5; 525/167.5

[58] Field of Search ................. 525/111, 111.5, 167.5, 525/168, 169, 170, 176, 165, 133.5

[56] References Cited

U.S. PATENT DOCUMENTS 4,220,737  9/1980  Kita ..................................... 525/169

Primary Examiner—Christopher A. Henderson
Attorney, Agent, or Firm—William A. Drucker

[57] ABSTRACT

A coating material containing a modified chlorinated resin which produces by the modifying step chlorinated resins containing less than 50% chlorine by weight with the medium of the resin modified by fatty acids so that it is adapted to be used as a coating material, printing ink, adhesive, and the like, especially suitable for polyolefin plastics and said coating material enabling manufacture of an excellent coating for weather resistance, adhesion, stability and in other coating performances.

2 Claims, No Drawings

COMPOSITION OF MODIFIED CHLORINATED RESINS

This is a continuation of Ser. No. 254,038 filed Apr. 14, 1981 now abandoned.

CROSS-REFERENCE TO RELATED APPLICATION

Parent application Ser. No. 254,038 discloses the process for modified chlorinated resins which comprises the step of modifying the chlorinated resins containing less than 50% chlorine by weight with the medium of the resin modified by fatty acids.

This invention is a continuation application of the above parent application and discloses preferable adaptation of the products disclosed by the parent invention.

BACKGROUND OF THE INVENTION

1. Field of the Invention

This invention is concerned with a coating material containing modified chlorinated resins which are suitable for use as a vehicle in coating materials, printing inks or adhesives for plastics, especially polyolefin plastics.

2. Description of the Prior Art

U.S. Pat. No. 4,220,737 discloses an air drying composition. In this invention, at least one ingredient selected from the group consisting of chlorinated polydiolefin rubber and chlorinated polyolefin is used as a binder. Furthermore, these chlorinated polymers have a chlorine content of at least 55% by weight, preferably at least 60% by weight.

As in this U.S. patent disclosure, it is usual in the prior art that mixtures of chlorinated rubber and chlorinated polyethylene of high chlorine content, of more than 50% by weight with alkyd and/or other resins are used as vehicles for coating materials and others.

However, the coating film obtained by the use of such chlorinated polyolefin resin mixtures was poor in its weather resistance and accordingly entailed many disadvantages in practical use by the reason of high chlorine content, of more than 50% by weight.

On the other hand, it has been thought that low chlorine content resins have intrinsically more severe disadvantages as compared to those with high chlorine content.

The first reason: these low chlorine resins are insoluble or only slightly soluble in common organic solvents and a sufficiently concentration cannot be obtained.

The second reason: when the resins are soluble, the corresponding solutions are of poor stability; dechlorination occurs at higher temperatures, whilst viscosity increases or gelation occurs at lower temperatures.

Thus, the resins of this kind, including the above noted U.S. patent could not hitherto be put into practical use as vehicles for coating materials and the like.

Furthermore, a coating material, a printing ink or adhesive being suitable for polyolefin plastics, i.e. polyethylene plastics or polypropylene plastics are not new.

SUMMARY OF THE INVENTION

A first object of this invention is to provide a coating material suitable to use for polyolefin plastics, i.e. polyehtylene plastics or polypropylene plastics.

A second object of this invention is to provide a coating material produced by modified chlorinated resins which are capable of overcoming these disadvantages, and which, at the same time, exhibit the advantageous properties obtained from resins of high chlorine content and low chlorine content collectively.

Another object of this invention is to provide a coating material obtained by a process for modifying the chlorinated resins with ease of processing mechanically or economically, and with high productivity without deteriorating the working environment.

An example of a coating material according to the present invention comprises the products pepared from the steps of modifying chlorinated resins with a chlorine content of less than 50% by weight by allowing said chlorinated resins to react with the resins modified by fatty acids.

The invention will be now described in detail.

DESCRIPTION OF THE PREFERRED EMBODIMENT

The chlorinated resins to be used in this invention include chlorinated polyethylene, chlorinated polypropylene, chlorinated copolymers of ethylene and propylene all of which contain less than 50% by weight chlorine. The reason why resins having a chlorine content of less than 50% by weight are employed in this invention is as follows:

On heating, the chlorinated polyolefin resins with a chlorine content of more than 50% by weight decompose in the course of the reaction with a compound with double bonds and evolves chlorine, by which the modification reaction is retarded.

In consequence, the film properties of the coating by using the resultant modified resin have many disadvantages, for example, in stability for agin, adhesion, wear resistance, shock resistance or in weather resistance.

All such film properties gradually deteriorate. On the contrary, when the chlorinated polyolefin resins with chlorine content of less than 50% by weight are used, the above mentioned modification reaction proceeds smoothly, and the composition thus obtained is excellent in its film properties such as the stability of resin, adhesion, durability, shock resistance, weather resistance, etc.

As original resins modified by fatty acid, where the rate of conjugation is more than 30%, alkyd resin, epoxy resin, phenol resin, polyamide resin and the like are employed. With respect to fatty acid, or oils containing fatty acid, where the rate of conjugation is more than 30%, those selected are the compounds consisting of conjugated diene, conjugated triene, conjugated acid and/or copolymerized oil, etc.

As for the above mentioned fatty acids, different sorts of acids are used for example, eleostearic acid, pseudoeleostearic acid, parinaric acid, licanic acid, or the dimeric acids synthesized from the same, and others.

As the above mentioned oils, the following isomerized oils are used; tung oil, dehydrated castor oil, isomerized soybean oil, conjugated linseed oil, and the like.

As the above mentioned copolymerized oils attained from fatty oil, urethanized oil, maleic oil, and others are used.

As the above mentioned alkyd resins, the following resins are used: acrylized alkyd resin, phenolized alkyd resin, epoxized alkyd resin, rosinized alkyd resin, maleinized alkyd resin, and others.

In producing the polyolefin resin modified by such fatty acid as above mentioned, the polyolefin resin of this kind can be obtained (1) by admixing the materials of said resins with said fatty acids or oils, the mixture thereof being subjected to the reaction in the presence or absence of catalyst for 1 to 7 hours during heating at 150° to 250° C., (2) by admixing the said original resins manufactured in advance in an inert atmosphere with said fatty acids, the mixture thereof being allowed to react in the presence or absence of catalyst for 1 to 7 hours during heating at 150° to 250° C. in an inert atmosphere.

The reason why the resins modified by said fatty acids with the rate of conjugation of more than 30% is as follows:

The resins modified by aid fatty acids with the rate of conjugation of less than 30% will be poor in reactivity with the chlorinated polyolefin resins.

The modified resins thus formed exhibit not so great a difference compared to cold-blended resins.

Hence, for improving the quality of chlorinated resins, the steps were found to be unsatisfactory.

On the contrary, when the resins modified by the fatty acid with the rate of conjugation of more than 30% are used, they react with the chlorinated polyolefin resins smoothly to demonstrate the noticeable effect of improvement, and the solubility and stability of resins can be remarkably improved.

In addition to the previously mentioned, this invention provides a method specified for reacting the said chlorinated polyolefin resins with modified resins by the said fatty acids.

The method is such that chlorinated polyolefin resins are allowed to react with the modified resins in an inert atmosphere such as nitrogen, helium, etc., during heating in the presence of a single or mixed catalyst such as halogenated metals, notably $AlI_3$, $AlCl_3$, $SnCl_2$, $BF_3$, metals notably Co, W, Cr, Ni, Se, Te, Mo, and their chlorides, oxides, which belong to the 6th group in the periodic table, and/or their chlorides (dioxides, carbonyles).

The resin composition thus produced is separated from the catalyst by filtration.

Referring to the reaction temperature and the reaction time in the above method, it is preferable to raise the temperature as high as possible on the condition that it does not cause decomposition of resins. As a rule, the optimum temperature of the reaction is from 60° to 250° C., while the optimum reaction time ranges from 1 to 14 hours.

In addition, it is preferable that a chlorinated resin be dissolved and suspended in a solvent by heating such as toluene, xylene and the like beforehand, and then to react it with modified resins.

Also, it is preferable that the above modified resin compounds be incorporated with resin ester gum and the like.

On the other hand, when chlorinated polyolefin resin is allowed to react with the modified resin in an oxygen free inert gas atmosphere as in the said method, oxidation is prevented in the presence of the above mentioned catalyst of low toxicity, the modification of chlorinated polyolefin resin can be easily conducted without using any specified device made of a special material and without deteriorating the working environment as well.

Further, when the composition of modified chlorinated polyolefin resin is to be used in the form of an aerosol paint, said resins must be dissolved in solvents which consist of 60% to 95% by weight of aromatic solvent and 40% to 5% by weight of either ketone solvents, oxygen-containing solvent, and chlorine-containing aromatic solvent, all of these last three solvents having a boiling point of more than 130° C. (preferably more than 145° C.).

As the above aromatic solvents, toluene, xylene and the like are used.

As the above kentone solvents, ethyl-n-butyl ketone; diisobutyl ketone, cyclohexanone, isophorone and the like are used.

As the above oxygen-containing solvents, cellosolves including ethylene glycol monoethyl ether acetate, ethylene glycol monobutyl ether acetate, diethylene glycol monobutyl ether, diethylene glycol monobutyl ether and the like are used.

As the above chlorine-containing aromatic solvents, monochlorobenzene, ortho-dichlorobenzene, para-dichlorobenzene and the like are used.

After being dissolved in either of the above mentioned solvents, the composition of modified chlorinated polyolefin resins are filtered from the catalyst and the other suspended particles.

In using the composition of modified chlorinated polyolefin resin in the form of an aerosol paint as mentioned above as solvents to dissolve the composition, 60 to 95% by weight of aromatic solvent together with 40 to 5% by weight of the solvents consisting of oxygen-containing solvents or aromatic chlorine-containing aromatic solvents are used as follows:

When the aromatic solvents such as toluene, xylene and the like are used individually, or when oxygen-containing solvents and/or chlorinated aromatic solvents are mixed with aromatic solvents at a rate less than or more than the above mentioned percentage, the dissolving capacity of these solvents are not enough, and the composition thus obtained is insoluble in propellant such as LPG, chlorofluoromethane and the like and separates.

Precipitation of pigments and agglomeration of resins are caused and sometimes clog nozzles. The smooth operation of spraying becomes unfeasible, and a beautiful coating film resulting from good levelling cannot be expected. Contrary to this, when a solvent that is composed of 60 to 95% by weight of aromatic solvent and 40 to 5% by weight of aromatic chlorinated solvent is used, then the dissolving capacity is greatly improved and all of the aforesaid controversial points can be settled, the beautiful coating film of good levelling being obtained.

On the other hand, oxygen-containing solvents or aromatic chlorinated solvents which are to be formulated with aromatic solvents with a boiling point of more than 130° C. are as follows:

When oxygen-containing solvents or aromatic chlorinated solvents, each having the boiling point of less than 130° C., are formulated with the aromatic solvents which have a relatively low boiling point, these solvents evaporate soon after having been sprayed (the levelling of coating film) only to attain a poor looking coating film (like orange peel). In contrast to this, when the aromatic solvents are formulated with the oxygen-containing solvents or the aromatic chlorinated series solvents each having the boiling point of more than 130° C., these solvents evaporate successively from the solvent of lower boiling point to the one of higher boiling point according to the order of their boiling points, in consequence of which there is no possibility of the solvents evaporating at one time whereby a beautiful coating film of good levelling is obtained.

When the said composition of modified chlorinated polyolefin resins is to be used as a paint, it will be sufficient for use in paint coatings or inks that coloring pigments such as carbon black, titanium dioxide, cyanine blue, azo dyes, etc., and additives and the other fillers are mixed therewith as occasion demands.

As mentioned above, the compositions of modified chlorinated polyolefin resins obtained according to these processes have excellent weather reistance as a result of the chlorinated resin having a chlorine content of less than 50% by weight.

At the same time, the solubility of said resins is improved and the shelf life of the resins is extremely prolonged as the result of the modification.

Therefore, the adhesion to rubber, plastics, especially polyolefin resins, i.e., polyethylene, polypropylene, metals and others are greatly enhanced, thereby being adapted to be used as vehicles for printing inks, etc.

The invention will now be described more particularly on the basis of the examples showing the most preferable embodiments, the comparisons indicating the relation to the prior art and the references serving for information.

EXAMPLES

Example 1 tung oil (rate of conjugation: 90%): 65 part by weight
glycerine: 15 part by weight
litharge (catalyst): 0.5 part by weight According to the above formulation, weighed materials were subjected to esterification in a stream of nitrogen gas at 230° C. for 90 minutes. Then the temperature was lowered to 150° C. The following materials were added thereto,
phthalic anhydrate: 22 part by weight
xylene (solvent): 5 part by weight Then the temperature were raised again up to 200° C. to make the condensation-reaction for 6 hours. The chlorinated polypropylene with chlorine content of 30% by weight (trade name: SUPER CHLON 7.03M, made by Sanyo Kokusaku Pulp K.K: toluene solution with solid component of 30% by weight) of 107 parts by weight was placed to the said system, and nitrogen gas was introduced.

This compound was made to react at 200° C. for 14 hours, then it was cooled and dissolved in xylene of 100 parts by weight. The properties of the composition thus attained is as in Tables 1 to 3 (listed later).

This example shows an embodiment wherein chlorinated polypropylene as a chlorinated polyolefin resin was used together with the tung oil-modified alkyd resin, which was obtained by being modified with the application of tung oil that is a fatty oil acid with the rate of conjugation of more than 30%.

The composition obtained in this example is excellent in stability, as shown in Table 1, and has a good adhesion to plastics such as polypropylene or on metals such as a sheet iron, and further it is good in wear resistance, shock resistance, and others. Film excellent in weather resistance can be obtained, as shown in Tables 2 and 3. Into the bargain, the salt spray test in conformity with the testing method in JIS Z2371 was carried out on the above coating film for 100 hours, where nothing abnormal was found therein, and its rust preventing power was also superior.

Example 2 conjugated linseed oil (rate of cojugation: 50%): 50 parts by weight
glycerine: 9 parts by weight
litharge (solvent): 0.5 parts by weight According to the above formulation: materials were subjected to esterification under the stream of nitrogen gas at 230° C. for 30 minutes. Then the temperature was lowered to 150° C. and the following materials were added thereto.
phthalic anhydride: 20 parts by weight
xylene (solvent): 5 parts by weight After heating up this compound again to 200° C. and allowing it to make the condensation-reaction, glycidyl methacrylate of 10 parts by weight was added to the compound. To the linseed oil-modified and epoxisized alkyd resins obtained by allowing the above compound to react for more 3 hours added 120 parts by weight of the chlorinated polypropylene with chlorine content of 30% by weight (the same as in Example 1). This compound was further allowed to react in the presence of the single catalyst of TeCO of 1 part by weight at 200° C. for 14 hours under the stream of nitrogen gas. Then it was cooled. Thereafter it was dissolved in toluene of 100 parts by weight and filtered off the catalyst. The properties of the composition of modified chlorinated polyolefin resin thus obtained are shown as in Table 1 to 3.

This example shows an embodiment wherein the composition of modified chlorinated polyolefin resin was formulated by using the chlorinated polypropylene as a chlorinated polyolefin resin and the linseed oil-modified and epoxisized alkyd resin which was modified by the conjugated linseed oil as a fatty acid with the rate of conjugation of more than 30%. The properties of the composition thus manufactured such as the stability of resin, and the adhesion, wear resistance, shock resistance, and weather resistance of the coating film were substantially equal to those in Example 1, as shown in Tables 1 to 3, and further the rust preventing power of the coating film was practically the same as in Example 1.

Example 3 dehyrated castor oil (rate of conjugation: 60%): 40 parts by weight
dimer acid (trade name: EMPOL 1022, made by EMERY Industries Co., America): 4 parts by weight
epoxy resin (trade name: EPICOAT 1004, made by SHELL Co.): 60 parts by weight The above-weighed materials were subjected to esterification during heating at 250° C. for 40 minutes under the stream of nitrogen gas. Subsequently the chlorinated polyethylene with chlorine content of 30% by weight (trade name: EMULLAX, made by Osaka Soda K.K.: xylene solution with solid component of 40% by weight) of 50 parts by weight was added thereto. After this compound was allowed to react under the stream of nitrogen gas and in the presence of the mixed catalyst consisting of NiCO of 0.5 parts by weight and Se of 0.5 parts by weight filtered off at 200° C. for 5 hours, it was cooled and then filtered off the catalyst. The properties of the composition of the modified chlorinated polyolefin resin thus manufactured are as shown in Tables 1 to 3.

This example shows an embodiment wherein the composition of the modified chlorinated polyolefin resin was formulated by using the chlorinated polyethylene as a chlorinated polyolefin resin and the caster oil-modified epoxy resin which was modified by the dehydrate caster oil as a fatty acid with the rate of conjugation of more than 30%. The properties such as the stability of resin, and the force of adhesion, wear resistance, shock resistance and weather resistance of the coating film of the composition of modified chlorinated polyolefin resin obtained in this example were substantially equal to those in Example 1, as listed in Tables 1 to 3, and further the rust preventing power of the coating film was also practically the same as in Example 1.

Comparison 1

When the chlorinated polyethylene with chlorine content of 30% by weight (trade name: EMULLAX, made by Osaka Soda K.K.: xylene solution with solid component of 40% by weight) was used as a vehicle for a coating material without being modified by a double bond-containing compound, the composition obtained was slightly opaque in appearance. Even after repeated filtrations, it was impossible to make said resin completely transparent. Because of the very poor stability of resin, it was impossible to make any coating material good enough to put into practical use.

Comparison 2

When the chlorinated polypropylene with chlorine content of 40% by weight (trade name: SUPERCHLON 803 M, made by Sanyo Kokusaku Pulp K.K.: xylene solution with solid componet of 30% by weight) was used as vehicle for coating material without being modified by double bond-containing compound, the composition obtained was very poor in the stability of resin, and not good enough to be put to practical use.

Compraison 3

When the chlorinated rubber with chlorine content of 55% by weight (trade name: ADECAPLEN, made by Asahi Denca K.K.: xylene solution with solid content of 30% by weight) was used as a vehicle for a coating material, the coating film was poor in weather resistance most of all. By way of example, the coating films painted on polypropylene, sheet iron and others scaled off at the time of investigating its progressive weather resistance in conformity to the testing method of JIS K5400 (later described).

It was impossible to obtain any coating material good enough to put into practical use.

Reference 1

In Example 1, when the soybean oil with the rate of conjugation of 21.6% which is a kind of fatty acid with the rate of conjugation of less than 30% was employed as a substitute for the tung oil which is a kind of fatty acid with the rate of conjugation of more than 30% and was tried to produce a composition of modified chlorinated resin under the same condition as in Example 1 in regard to the other terms, then the composition thus obtained revealed very inferior properties as for the stability of resin, and the force of adhesion, wear resistance, shock resistance, and weather resistance of the coating film.

Reference 2

In example 2, when the chlorinated rubber with chlorine content of 55% by weight was employed as a substitute for the one with chlorine content of 45% by weight and was tried to produce a composition of modified chlorinated polyolefin resin under the same condition as in Example 2 in regard to the other terms, then the composition thus obtained revealed the very inferior properties of the stability of resin, and the force of adhesion, wear resistance of the coating film.

The properties of the composition of modified chlorinated resin given in Example 1 to 3 and References 1 and 2 are shown hereinafter collectively in Tables 1 to 3. In this connection, the measuring method of the properties listed in the above Tables 1 and 3 will be described as follows:

The coating film was formed on polypropylene, sheet iron and others by painting; of each vehicle given in the aforementioned examples, rutile type titanium dioxide and toluene were mixed in the ratio of 60 parts: 30 parts: 10 parts, respectively, and further dispersed into the state of fine particles of less than 30 micron.

Adhesion: measured by the cross-cut cellophane tape adhesion test in compliance with JIS K 5400.

Wear Resistance: measured by the abrasion loss test (mg/100) in compliance with JIS K 6902.

Shock Resistance: measured by means of the DuPont testing machine per sample of 300 g.30 cm in compliance with JIS K 5400.

Accelerated Weathering: measured by means of sunshine carbon weathering machine for the exposure time 500 hours in compliance with JIS K 5400.

In the case of using chlorinated polyethylene, chlorinated polypropylene, chlorinated rubber in Example 1 to 3, Comparisons 1 to 3 and References 1 to 2, they should be used in the state of being completely dissolved or suspended by heating so as to allow them to smoothly dissolve or suspend.

TABLE 1

| performance sample | Stability of Coating Material | | |
|---|---|---|---|
| | directly after manufacture | overnight stand- filter - one day stand (20° C.) | overnight stand- filter - one day stand (5° C.) |
| Example 1 | transparent | same as left | same as left |
| Example 2 | transparent | same as left | same as left |
| Example 3 | transparent | same as left | same as left |
| Reference 1 | opaque | same as left | same as left |
| Reference 2 | opaque | same as left | gelatinized |

TABLE 2

| | Performance of Coating Material Painted on Polypropylene | | | |
|---|---|---|---|---|
| performance sample | adhesion | wear resistance | shock resistance | accelerated weathering |
| Example 1 | 100/100 | 18 | nothing wrong | not changed |
| Example 2 | 100/100 | 15 | same as above | same as above |
| Example 3 | 100/100 | 8 | same as above | same as above |
| Reference 1 | 0/100 | 50 | scaled off | scaled off |
| Reference 2 | 0/100 | 52 | same as above | same as above |

TABLE 3

| | Performance of Coating Material Painted on Sheet Iron | | | |
|---|---|---|---|---|
| performance sample | adhesion | wear resistance | shock resistance | accelerated weathering |
| Example 1 | 100/100 | 10 | nothing wrong | not changed |
| Example 2 | 98/100 | 10 | same as above | same as above |
| Example 3 | 100/100 | 3 | same as above | same as above |
| Reference 1 | 85/100 | 25 | scaled off | scaled off |

TABLE 3-continued

| performance sample | Performance of Coating Material Painted on Sheet Iron | | | |
| --- | --- | --- | --- | --- |
| | adhesion | wear resistance | shock resistance | accelerated weathering |
| Reference 2 | 70/100 | 28 | same as above | same as above |

This invention has been described circumstantially hereinbefore in citing its various examples, comparisons, and references, although only coating materials were given as such examples. However, it will be apparently understood that other widely different embodiments of the invention may be made also referring to printing inks, adhesives and so on without departing from the spirit of the invention and the scope of the appended claims.

Therefore, the invention is not limited to the specific embodiments thereof except as defined in the appended claims.

What is claimed is:

1. A coating material which contains a modified chlorinated resin vehicle, comprising a chlorinated resin with chlorine content of less than 40 percent by weight selected from the group consisting of chlorinated polyethylene, chlorinated polypropylene and copolymers of chlorinated ethylene and chlorinated propylene reacted with a resin modified by fatty acid with a rate of conjugation of more than 30 percent in the presence of a catalyst while heating from 100° C.–200° C. under a stream of inert gas.

2. A coating material as set forth in claim 1 characterized in that the resin modified by fatty acid is selected from the group consisting of acrylized alkyd resin, phenolized alkyd resin, epoxized alkyd resin, rozinized alkyd resin and malenized alkyd resin.

* * * * *